Aug. 6, 1935.  A. PREISMAN  2,010,242

APPARATUS FOR MEASURING ELECTRICAL CONDUCTIVITY

Original Filed April 17, 1928

INVENTOR
Albert Preisman

Patented Aug. 6, 1935

2,010,242

UNITED STATES PATENT OFFICE 2,010,242

APPARATUS FOR MEASURING ELECTRICAL CONDUCTIVITY

Albert Preisman, New York, N. Y.

Original application April 17, 1928, Serial No. 270,741. Divided and this application February 24, 1932, Serial No. 594,878

7 Claims. (Cl. 175—183)

My present invention relates to apparatus for electrical measurements, and has particular reference to apparatus for ascertaining the electrical conductivity of materials, the present application being a division of my copending application Serial No. 270,741, filed April 17, 1928 now Patent No. 1,966,185.

Practical experience has revealed various defects in ohmmeters in present usage. For example if resistances are measured which are indicated near the infinity end of the scale of present day ohmmeters, wholly unreliable readings are obtained.

Again ohmmeters now in use that are adapted to measure high resistances are expensive and built of dynamic parts that are delicate. Moreover, they cannot utilize alternating current as a source of potential. All these limitations handicap their every day use.

Now, I have discovered certain principles involved in the performance of the well known audion or electronic discharge tube, and applied them in an effort to produce an instrument which will not only be an ohmmeter capable of accurately measuring resistances, but one that is capable of many independent uses, and yet be comparatively inexpensive, rugged in construction, and capable of use with alternating current as well as direct current.

Heretofore it has been considered that if the grid element of an electronic discharge tube, hereinafter referred to as an audion for brevity, be insulated from the filament element by a resistance of forty megohms or more, then it will be "free". That is to say, it will assume a potential in most cases which is negative with respect to the cold negative end of the filament.

Again, prior to my discovery, it has been thought that the "free" grid potential is not a reproducible value but that it depends upon the values of the filament and plate voltage, and also upon which of the two circuits, the plate or filament, are closed first.

But, using standard UX201A, UX240 and UX210 tubes, I have found the "free" grid to be always negative relative to the filament. Again, I have discovered that contrary to the aforementioned teachings of the prior art, the potential of a "free" grid, as measured by the plate current, is always the same for the filament and plate potentials, or if both of these be increased or decreased by a reasonably small amount, the plate current due to the "free" grid is practically unchanged.

In the said original copending application it has been demonstrated from purely mathematical and physical considerations, sustained by experimental verification, that by measuring the plate current of an audion tube having the material to be measured connected in series between a grid battery and the grid, I can ascertain quantitatively the conductivity of the material even if this be very low and comparable with the leakage in the tube and associated parts. I have, in addition thereto, devised various arrangements which enable this fundamental invention to be readily operated with any type of audion tube, and applied to uses to be hereinafter fully disclosed.

While one of the principal uses of the principles above described is for the measurement of resistance or conductivity, especially if the former be of exceedingly high values, as from one to one thousand megohms, or more, the invention is also applicable to other uses. In fact, conductivity of electrolytes and ground resistance may be measured, using in such cases alternating current to avoid polarization of the electrolyte liquid or earth.

Accordingly one of the main objects of my invention is to provide apparatus for indicating quantitatively the conductivity of materials in which such materials are inserted in series with the grid of an electronic discharge tube, and a source of grid potential, the value of the plate current of said tube at a specific grid potential being a measure of the conductivity of the particular material being measured.

Another object of my invention is to provide a direct reading ohmmeter comprising an electronic discharge tube having a material to be measured and a source of grid potential in series with the grid of the tube, the said grid potential source being adjustable to render the ohmmeter multi-range, and independent of tube or voltage variation.

Other objects of my invention are to improve generally the simplicity and efficiency of such devices and to provide a device or apparatus of this kind which is durable, reliable in operation, and economical to manufacture.

Still other objects of my invention will appear as the description proceeds, and such objects should be considered as included in the herein statement of the objects of invention.

The invention may now be more fully understood from the following description when read in connection with the accompanying drawing in which.

Figure 1:
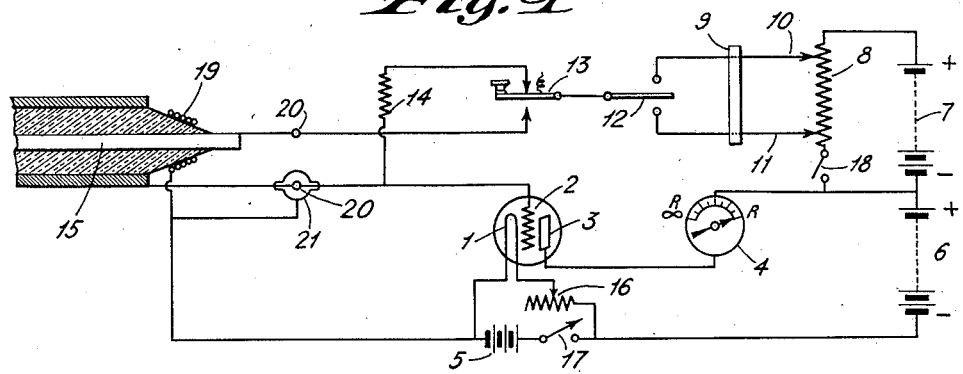
Fig. 1 is a circuit diagram of an apparatus, operated by direct current batteries, and adjustable for use with any audion tube, by means of which the method is carried out.

Referring to Fig. 1, reference characters 1, 2 and 3 designate the filament (electron emission electrode), grid and plate respectively of a tube of conventional design. The filament 1 is heated by a current source known as the filament or "A" battery and designated as 5. The thermionic current between the filament (hot cathode) and the plate (cold anode), is caused to flow through a plate current meter 4 (milliammeter) by means of a plate or "B" battery 6. Of course any other forms of electronic discharge devices may be employed in carrying my invention into effect.

The grid 2 is connected to a source of adjustable potential or grid battery 7 which is positive relative to the filament. As will be observed from Fig. 1, part of the "B" battery could be used as the grid battery. The material whose electrical characteristic is to be ascertained, is interposed in the circuit between the grid 2 and the battery 7. In Fig. 1 the insulation resistance of a cable 15 is to be measured. It should be noted that the cable possesses capacity as well as resistance.

A potentiometer 8 is placed in the circuit between the unknown cable resistance 15 and the grid battery 7 in order to adjust the positive potential being applied to the grid. This device is used to correct for tube or battery voltage variations. An insulated support 9 for two tap-offs 10, 11 constitutes the adjusting mechanism. The support 9 operates as one unit and thereby, by means of switch 12 which allows either grid potential to be applied to the grid 2, gives the instrument two ranges since either tap 10 or 11 may be connected to the grid. The advantage of such an arrangement will be explained later.

A conventional two-point push button switch 13, or any other type of double-throw switch, connects the potentiometer to the unknown cable resistance 15, or a calibrated high resistance 14. The calibrated resistance is normally connected to the switch 13 and is in circuit between the grid potential source 7 and the grid 2. Its purpose is to enable the plate meter 4 to be referred to a predetermined mark by varying the grid potentiometer 8, thus ensuring a constant reference point regardless of battery or tube variations.

Guard terminals 19 and 21 of conventional design are interposed in the circuit from the insulation of cable 15 and the contacts 20 to the filament battery 5. The purpose of the guard terminals is to prevent false readings due to leakage, whether in the set, or over the surface of the material being tested. These expedients assure accurate determinations when dealing with extremely high resistances.

A pair of battery switches 17 and 18 control the filament battery and grid battery respectively, and in actual construction they may be operated as a unit in the form of a two-pole single throw switch. To compensate for voltage variations in the battery 5 a filament rheostat 16 is inserted in the filament circuit.

As previously explained the plate meter 4 measures the resistance $R_x$ of the material between the contacts 20. If the resistance is infinite in value, as where the contacts 20 are not connected to anything, the grid 2 is essentially "free". It assumes a negative charge with respect to filament 1, thus causing the plate current to be very low. As this unknown resistance $R_x$ decreases through finite values, the grid, with the aid of the grid battery 7, is able to discharge to the cold end of the filament.

The grid thus becomes less negative thereby allowing the plate current $I_p$ to increase. This increase is noted on the milliammeter 4 in the plate circuit which may be calibrated to read directly in megohms. As shown in Fig. 1, and it being understood that the switches 12, 17 and 18 are closed, the pointer is at the low end of the scale, the scale reading directly in values of resistance R. As the resistance of the material being measured increases, the pointer moves to the left. When resistance of infinite value is measured, as explained before, the pointer is near the extreme left or infinity position of the scale. This should be obvious from the fact that, as stated in the previous paragraph, when the grid is "free" (that is to say, the resistance between the contacts 20, 20 is infinite), the plate current is very low.

For every value of $R_x$ there will be a corresponding value of $I_p$, provided all voltages are maintained constant at some predetermined values. The adjustable external grid potential 7 insures this in the following manner. I have determined experimentally that in order to adapt different tubes of the same type to the same scale on the meter 4, it is necessary to adjust the zero-error correction thereon, to get the same "free" grid reading. This is done by letting the unknown resistance be infinity, as would be the case with air. Then the smallest $R_x$ value is found than can be read on that scale range. In other words, it is necessary to adjust the instrument to read the same at the two extremes of the scale; namely, at $R_x = \infty$, and $R_x =$ lowest value indicated on the scale.

This is accomplished by means of the calibrated resistance 14 and is based on the fact that while different tubes may vary in their actual plate currents for a given value of $R_x$ (unknown resistance) and $E_t$ (total grid voltage) their $R_x$ vs. $I_p$ curves are practicaly identical. Hence, if these curves for various tubes are matched at their extreme values, intermediate values will coincide to about an accuracy as can be detected on the meter 4.

In use, then, assuming that it has been predetermined that when the potentiometer 8 has been tapped as shown in Fig. 1, the switch 12 closed on a desired contact, and the switches 17, 18 closed, the meter 4 reads as shown in Fig. 1, when switch 13 is in normal position. That is to say, the resistance of the calibrated element 14 is being measured. Prior to this, the infinity resistance reading has been taken by leaving the contacts 20 free, and depressing the switch 13.

For different tubes this infinity reading on meter 4 may vary, but by means of the zero-error correction on the meter the pointer may be set to the infinity mark on the scale. Then, if the known resistance is off the calibrated resistance mark on the scale, by shifting 9, and releasing switch 13 so it is in normal position, the pointer of the meter may be set over the calibrated value on the scale. Obviously, adjusting the grid voltage would have no effect on the other end of the scale where the resistance is infinity.

Thus, when the cable 13 is now connected to the contacts 20, regardless of the fact that tubes have been changed or that a particular tube has been used for a long time, the switches 17, 18 are closed and the pointer observed on the meter 4. If the pointer is not over the calibrated value of the scale, the potentiometer 8 is adjusted until the pointer is over the value. Of course, the switch 12 is closed on either tap, depending on whether the higher potential represented by tap 10 is to be used, or whether the lower potential represented by tap 11 is to be used.

Then the key 13 is depressed and the pointer reading on the meter observed. Should other readings be taken, the key 13 constantly indicates due to its normal position that the instrument is reading true. If the battery strengths change, or any other variation occurs, the instrument can be made to read the same for all values of $R_x$ between infinity and the lowest value than can be read on the meter, by the means described above.

The advantages of using an adjustable external grid potential source may be summarized as follows:

1. It makes the instrument more sensitive to large values of $R_x$.

2. At the larger values of $R_x$, the scale is more open.

3. In conjunction with the zero-error adjustment of the meter, it enables different tubes to be adapted to the same scale on the plate meter, thus making the instrument a measuring device rather than a mere translating or indicating device.

4. It places $R_x$ in series with the tube and socket leakage instead of in parallel to it, so that $R_x$ can be read more accurately at high values, and also renders the instrument independent of relatively large variations in leakage.

Figure 2:
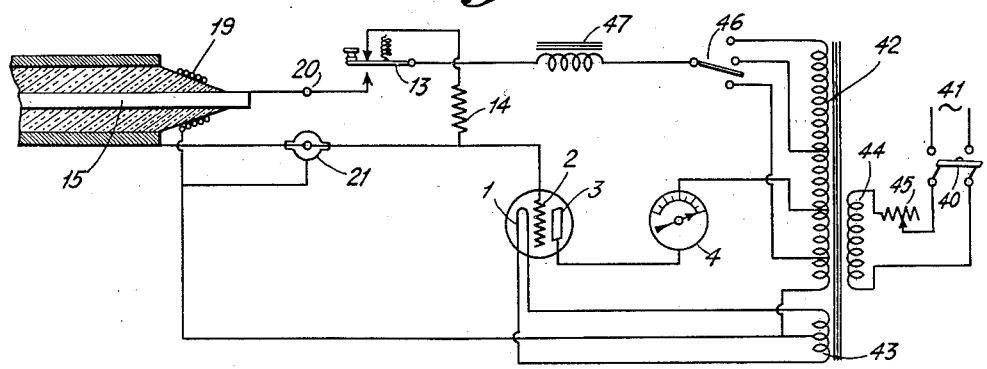
Fig. 2 is a circuit diagram showing the arrangement of the apparatus in Fig. 1, for connection to an alternating current source.

As stated heretofore, my invention with some changes can be applied to an alternating current source. In Fig. 2 is shown the tube 1, 2, 3 and plate meter 4 in circuit with the cable 15 to be measured and the calibrated resistance 14 as described heretofore. A double-pole single throw switch 40 closes the circuit and allows current from alternating current source 41 to flow therethrough. A transformer primary 44 has an adjustable resistance 45 connected thereto which compensates for variations in tube characteristics and line voltage. The function is similar to that of the adjustable potentiometer in Fig. 1.

A grid and plate secondary 42 tapped by a switch 46 serves to feed current to the plate and grid. By means of the switch 46 different grid voltages for different ranges of the instrument are procured. A filament secondary 43 connects to the filament, and heats the filament. An inductance 47, of ten henries or more, is inserted in the grid circuit to balance the capacity in the unknown cable.

In this alternating current modification the rectifying properties of the grid or control element are used as well as its amplifying effect, and due to the former effect, pulsating direct current is applied to the unknown resistance.

Since plate current $I_p$, flows only during the half cycles when the plate is positive, it is only during these half cycles that the grid has any effect on $I_p$, and since the grid is also made positive through $R_x$ at these times, it can vary $I_p$ depending upon the value of $R_x$.

Since $R_x$ may have capacity $C_x$ as well, the inductance coil 47 is used to correct the decreasing effect of $C_x$ upon $I_p$, thus rendering the readings independent of $C_x$. This seems to be due to the fact that the inductance maintains the grid current, and therefore the grid potential, even after the potential $E_t$ has decreased to zero again. This is probably due to the fact that the inductance spreads the grid current pulses over a greater portion of the half cycle and thus prevents the charge in $C_x$ making the grid negative and thereby distorting the plate current by making it more peaked whereby the average or direct current value of it as measured on the plate milliammeter 4 would be lower.

In the operation of this alternating current embodiment, to calibrate the tube all voltages may be varied by adjusting the rheostat 45 in the primary circuit 44. This adjustment is available in addition to the infinity, or "free" grid, adjustment which is adjusted by means of the zero-error adjustment on the plate meter.

To obtain several ranges as explained before different values of $E_t$ may be used. To do this, the high tension secondary winding 42 is tapped at suitable points and connected through a rotary switch 46 to the line terminal.

Of course, this modification can be used in conjunction with any means for maintaining constant voltage across the primary and associated resistor.

Figure 3:
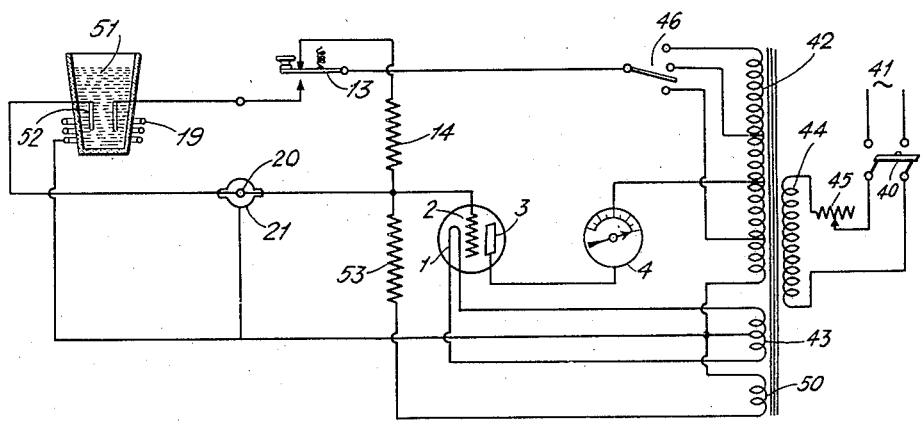
Fig. 3 shows an adaptation of the apparatus shown in Fig. 2 to the testing of an electrolyte.

I will now describe another application of the circuit shown in Fig. 2. It is necessary at times to measure $R_x$ (the unknown resistance) while passing alternating current through it. This occurs when $R_x$ is an electrolyte or earth (ground resistance test), in which case direct current can not be used, since polarization is set up if it is. To measure such resistance, the method shown in Fig. 3 is employed. Elements found in Fig. 2 have the same numerals. Here the internal grid to filament resistance, $R_{gf}$ is shunted by an external resistor 53, comparable to it in value. I have used one of about 50,000 ohms value, biased as shown by a reversed secondary winding 50 (of approximately three volts potential, or that of the "free" grid). During the positive half cycle this winding 50 is negative, and thus maintains the 50,000 ohms resistor 53 and connected grid at the same potential as when the latter is free.

Since $I_p=0$ during the negative half cycle, the grid can have a positive or any other bias without being able to affect the plate meter reading. An ordinary "C" battery may be used as an alternative. $R_x$ is here an electrolyte 51, whose capacity $C_x$ is so small compared to its conductance, $1/R_x$, that the former effect is negligible when the electrolyte is placed between electrodes 52.

Two currents thus flow through $R_x$ viz., an alternating current which also flows through 53, and a direct current, which flows through the rectifying grid. If $R_x$ is large, say one megohm or more, and 53 is comparatively small, about equal to $R_{gf}$, the direct current component will be only a fraction of the alternating current component, so that substantially alternating current flows through $R_x$. At the same time, no inductance is required in the grid circuit as was in Fig. 2, for $C_x$ must be negligible, otherwise it will discharge through 53, and then on the next positive, charging half cycle, draw additional charging current through the grid, and thus indicate far too low a value for $R_x$. $C_x$ can be made small by proper design of the electrolytic cell. It is inherently small in the case of ground resistance tests.

Another effect of the resistor 53 is to decrease the sensitiveness of the device, or, in the other words, make it read at full scale a much lower value of $R_x$. Since ground and electrolytic cell resistances are fairly low, this is a desirable feature.

Practically, this modification is effective since if the internal resistance of the tube between grid and filament, $R_{gf}$ is shunted with another resistance $R_{sh}$ (that is the resistor 53 in Fig. 3) it becomes necessary to bias it negatively with respect to the grid to oppose $e_g$—the filament potential projecting electrons to the grid—and prevent the grid from discharging through $R_{sh}$ and thus changing its own potential.

The resistance from the filament to the grid is now no longer $R_{gf}$, but less, and equal to.

$$\frac{1}{\frac{1}{R_{of}}+\frac{1}{R_{sh}}} = R'_{of},$$

where evidently $R'_{gf} < R_{gf}$.

In the case of the electrolytic cell, suppose $R_{gf} = R_{sh} = 50,000$ ohms, and $R_x = 1,000,000$ ohms. During the positive half cycle, when the grid is conducting current, the total resistance of the grid circuit is $$R_x + \frac{1}{\frac{1}{R_{of}}+\frac{1}{R_{sh}}} = 1,000,000 + \frac{1}{\frac{1}{50,000}+\frac{1}{50,000}}$$

$$= 1,025,000 \text{ ohms}$$

During the negative half cycle the potential is reversed; the grid carries no current; only $R_{sh}$ is carrying current. The resistance is now $R_x + R_{sh} = 1,050,000$ ohms. Thus, the total grid resistance varies 25,000 ohms out of 1,025,000 ohms, or 2.4% at the most. Hence, substantially alternating current passes through $R_x$, and the higher its value the more nearly is this so.

This form of instrument is calibrated and compensated for variations in line voltage in a manner similar to the method shown in the alternating current modification shown in Fig. 2. If desired, various values of resistances may be used for 53 to provide different ranges, instead of using different grid voltages through switch 46. The lower the resistance of 53 is, the more nearly alternating current is the current through $R_x$.

It will be obvious that the general principles herein disclosed may be employed in many other organizations widely different from those illustrated, without departing from the spirit of the invention as defined in the following claims.

What I claim is:

1. In the art of ascertaining the conductivity of materials which are polarized upon passage of direct current, the combination with an electronic discharge tube, of means to supply alternating current to the filament, plate and grid circuits of said tube, a material the conductivity of which is to be ascertained in said grid circuit, and a calibrated resistance negatively biased with respect to the grid, in circuit with the grid and filament, a plate meter in said plate circuit, said resistance conducting current in either direction coming from said alternating current supply through said material in addition to the uni-lateral current flowing between the grid and filament from said material, thereby superimposing upon said unilateral current an alternating current sufficiently large in comparison with the latter substantially to prevent the latter from polarizing said material.

2. A device comprising an electronic discharge tube having, at least, an electronic discharge cathode, anode, and control electrode, alternating current supply means for energizing the various circuits of the tube, means for applying an alternating current potential to the control electrode, means adapted to receive an electrolytic material whose conductivity is to be ascertained in the control circuit, a predetermined suitably biased resistor connected between the control electrode and the cathode, means in the anode circuit for ascertaining the current flowing therein or its effects, said current or its effects serving to ascertain the conductivity of said material while substantially alternating current is flowing through said material.

3. A device comprising an electronic discharge tube having, at least, an electronic discharge cathode, anode, and control electrode, alternating current supply means for energizing the various circuits of the tube, means for applying an alternating current potential to the control electrode, means adapted to receive an electrolytic material whose conductivity is to be ascertained in the control circuit, a predetermined suitably biased resistor connected between the control electrode and the cathode, means in the anode circuit for ascertaining the current flowing therein or its effects, means adapted to vary the indication of said measuring means for additional calibration purposes, a suitably biased predetermined resistor connected between the control electrode and the cathode, a calibrated resistor to check the calibration of the device, and means for connecting either said calibrated resistor or material whose conductivity is to be ascertained in the control circuit.

4. A circuit arrangement for measuring the conductivity of a material subject to polarization or similar effects comprising a source of alternating current, an electron discharge tube having its electrodes connected to said source for energization thereof, said material being connected to said source and tube, and a current indicator in the cathode-plate circuit of the tube to indicate the said conductivity and a grid biasing resistor connected between the grid and cathode of said tube.

5. A circuit arrangement for measuring the conductivity of a material subject to polarization comprising a source of alternating current, a multi-electrode space discharge tube, circuit connections between the tube, source and material for impressing on the material an unrectified alternating current superimposed on a rectified alternating current due to the grid electrode of said tube, and means for employing the rectified anode current of said tube as a measure of the said conductivity.

6. An arrangement for measuring the resistance magnitude of an unknown resistance, comprising two parallel paths in series with said unknown resistance, a source of alternating current potential, a tube, one of said paths connected to the control electrode of said tube and rendered uni-directional in conductivity by the rectifier action of said electrode, said other path being connected to said source and being duo-directional in conductivity, and means for utilizing the anode current of the tube as a measure of said magnitude.

7. A circuit arrangement for determining the conductivity of a material subject to polarization, comprising an electron discharge tube having at least a cathode, grid and anode, said anode being at a positive potential with respect to the cathode, means responsive to variations in the tube space current path for indicating said conductivity, a source of alternating current potential, a path between the grid and cathode of said tube including a resistor and a negative grid bias means, said source being connected across said resistor, said material being connected between said source and one side of said resistor, and said bias means being connected between the cathode and the cathode side of said resistor whereby inherent capacities due to said bias means in shunt with said resistor have substantially no effect on conductivity indications.

ALBERT PREISMAN.